(12) United States Patent
Amstutz et al.

(10) Patent No.: US 6,814,243 B2
(45) Date of Patent: Nov. 9, 2004

(54) REPLACEABLE FILTER WITH LOCKING MECHANISM

(75) Inventors: Aaron K. Amstutz, Princeville, IL (US); David C. Becktel, Calgary (CA); Jeffrey R. Ries, Metamora, IL (US); Kevin K. Socha, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 37 days.

(21) Appl. No.: 10/209,510

(22) Filed: Jul. 31, 2002

(65) Prior Publication Data

US 2003/0019809 A1 Jan. 30, 2003

Related U.S. Application Data

(63) Continuation-in-part of application No. 09/644,379, filed on Aug. 23, 2000, now Pat. No. 6,481,580.

(51) Int. Cl.[7] .............................................. B01D 27/00
(52) U.S. Cl. ....................... 210/457; 210/440; 210/442; 210/487
(58) Field of Search .......................... 210/437, 440–444, 210/457, DIG. 17, 487; 403/343, 348, 349

(56) References Cited

U.S. PATENT DOCUMENTS

| 5,556,542 | A | * | 9/1996 | Berman et al. .............. 210/232 |
| 5,762,788 | A | * | 6/1998 | Gullett ........................ 210/232 |
| 5,868,932 | A | * | 2/1999 | Guichaoua et al. ......... 210/440 |
| 5,888,384 | A | | 3/1999 | Wiederhold et al. |

FOREIGN PATENT DOCUMENTS

WO      WO 02/16004 A     2/2002

\* cited by examiner

Primary Examiner—Matthew O. Savage
(74) Attorney, Agent, or Firm—Mike Huber

(57) ABSTRACT

A filter assembly with a replaceable filter element and a reusable filter housing, which incorporates a locking mechanism to ensure that the filter system will not be operated without a filter element installed.

8 Claims, 4 Drawing Sheets

Fig_4_
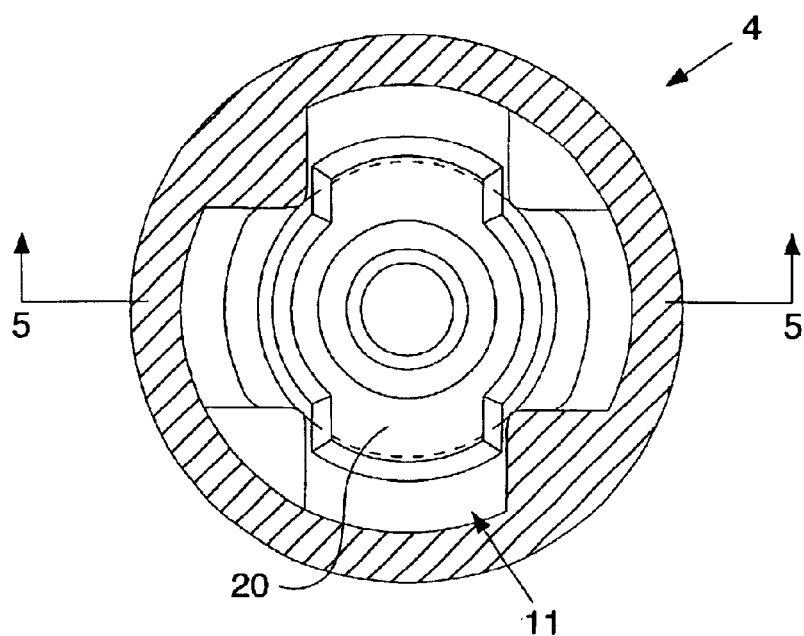
Fig_5_
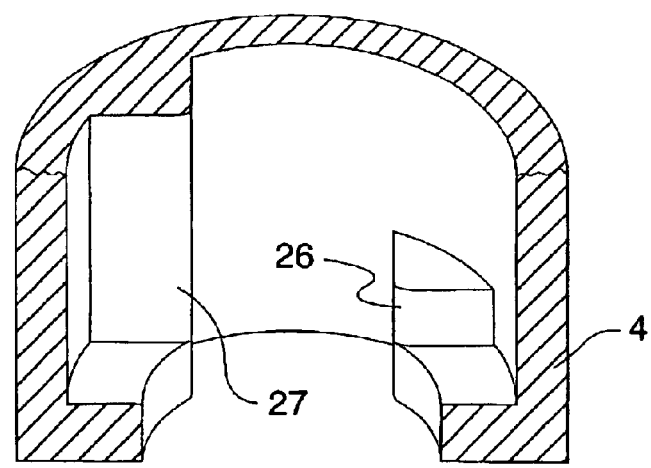

REPLACEABLE FILTER WITH LOCKING MECHANISM

This application is a continuation-in-part of application Ser. No. 09/644,379, filed on Aug. 23, 2000, now U.S. Pat. No. 6,481,580.

TECHNICAL FIELD

The present invention relates generally to replaceable filter elements, and more particularly to a replaceable filter elements that include an integral locking mechanism to affix the replaceable filter element to a corresponding filter housing.

BACKGROUND

Filter assemblies for filtering liquids such as engine oil, hydraulic oil and fuel are well known in the art. A fuel filter assembly is installed in the engine fuel lines to remove grit and other contaminants from the fuel or other fluids before it is used to increase the service life of the fluid system and associated components. Disposable or "throw away" type fluid filters are also known in the art. The disposable fluid filter, however, represents a waste of natural resources, labor and materials.

To solve this problem in the past, a reusable fluid filter assembly having a detachable cover, a filter element, and a housing, having a hollow central core to permit the replacement of the filter element, has been developed and is known in the art. U.S. Pat. No. 5,846,416 issued Dec. 8, 1998, to Caterpillar Inc., discloses such a reusable filter assembly. A typical reusable filter assembly has a filter housing which contains a filter element used for filtering the fuel as it circulates through the housing. The housing ordinarily has a first end adapted for coupling the filter assembly to the engine block of the internal combustion engine by means of an externally threaded housing that threads onto a corresponding internally threaded configuration on the engine block. The housing also has a second end that is ordinarily closed.

A recurring problem with reusable filter units such as the type described above, occurs when the owner of the vehicle and/or the maintenance technician servicing the internal combustion engine removes the filter element for replacement. The owner of the vehicle and/or the maintenance technician may dispose of the used filter element but unknowingly fail to replace the filter element or replace the filter element with a sub-standard will-fit filter. Since the threaded reusable housing attaches to the engine, it is possible to attach the housing to the engine without the correct replacement filter installed, or any filter installed for that matter. Operation of the fluid systems without a filter element or without the correct filter element can jeopardize the integrity of the filtering system, resulting in very serious consequences.

The present invention is directed to overcome one or more problems identified above.

SUMMARY OF THE INVENTION

In accordance with one aspect of the present invention, a replaceable filter element is provided. The replaceable filter element comprises: a central tube having radially oriented apertures; a filter element concentrically disposed about the central tube; a filter coupling mechanism disposed proximate a first end of the central tube; and a locking mechanism integrally disposed at a second end of the central tube. The locking mechanism includes a female receptacle coaxially oriented with the central tube and a plurality of tangs axially extending and spaced around the periphery of the female receptacle, such that the tangs adapted for engaging and locking a corresponding male member.

BRIEF DESCRIPTION OF THE DRAWINGS

The above and other aspects, features and advantages of the present system and process for industrial paint operations will be more apparent from the following more particular description thereof, presented in conjunction with the following drawing, wherein:

FIG. 4 is an end view of the preferred embodiment of the replaceable filter element; and FIG. 5 is a cross-sectional view of the female locking mechanism of the preferred embodiment of the replaceable filter element.

DETAILED DESCRIPTION

The following description is of the best mode presently contemplated for carrying out the invention. This description is not to be taken in a limiting sense but is made merely for the purpose of describing the general principals of the invention. The scope and breadth of the invention should be determined with reference to the claims.

Figure 1:
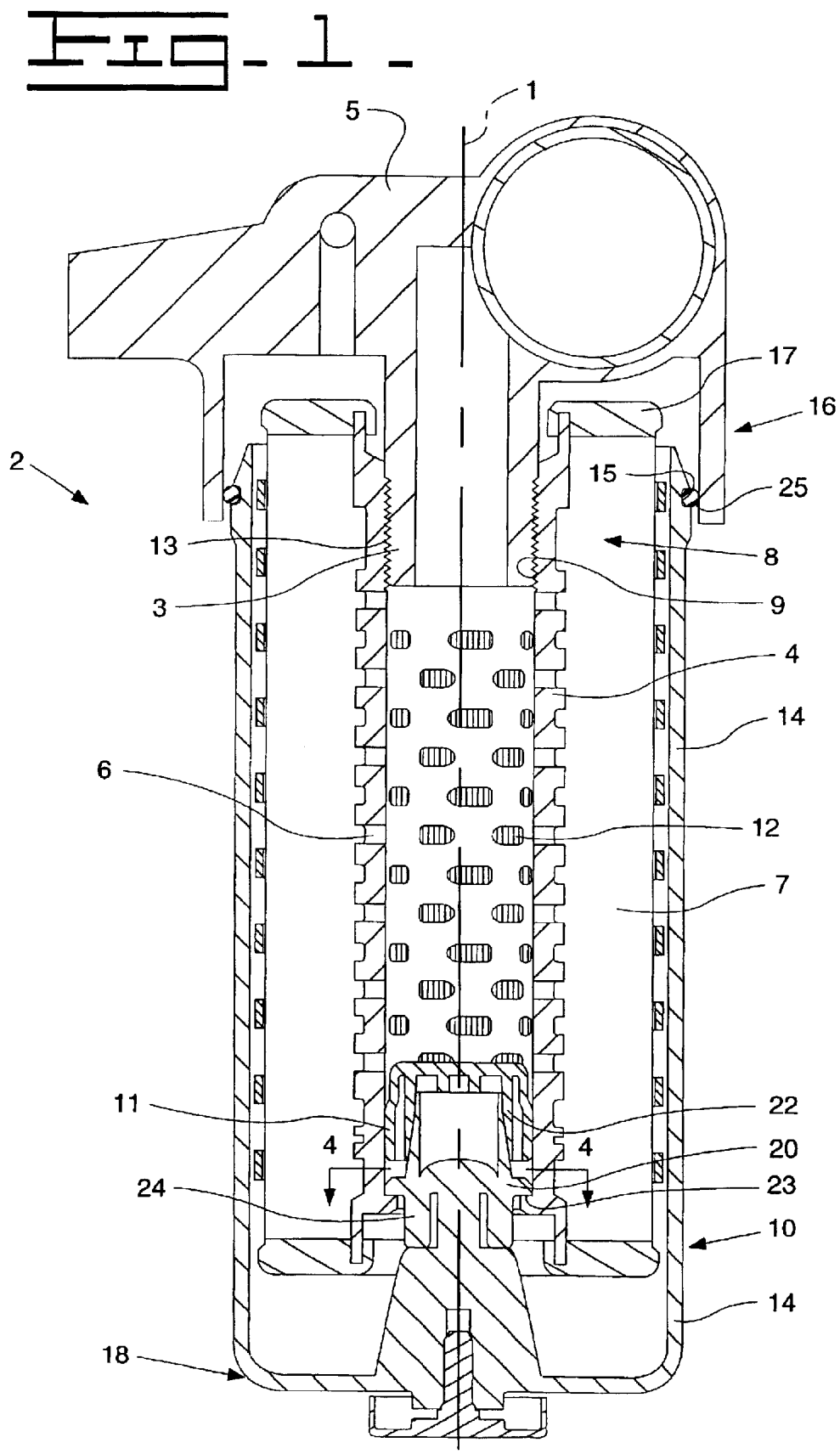
FIG. 1 is a sectional view of a fuel filter assembly incorporating the replaceable filter element.

With reference to FIG. 1, a fluid filter assembly 2 including a filter base 5, a reusable filter housing 14, and a replaceable filter element 4 is depicted.

The filter base 5 is disposed generally above the replaceable filter element 4 that is attached to the filter base 5.

In the preferred embodiment, the filter element 4 is threaded to the filter base 5 by means of a threaded stud 3 mated with internally disposed threads 9 of a central tube member 6 of the replaceable filter element 4. The fluid filter assembly 2 is especially adapted for use as a fuel filter assembly in a fuel system of an internal combustion engine (not illustrated), such as a diesel engine, for removing particulate matter from the fuel and separating the water from the fuel.

Filters of this type may also be used to filter impurities from oil in the lubrication system of an internal combustion engine or for other filter applications.

Figure 2:
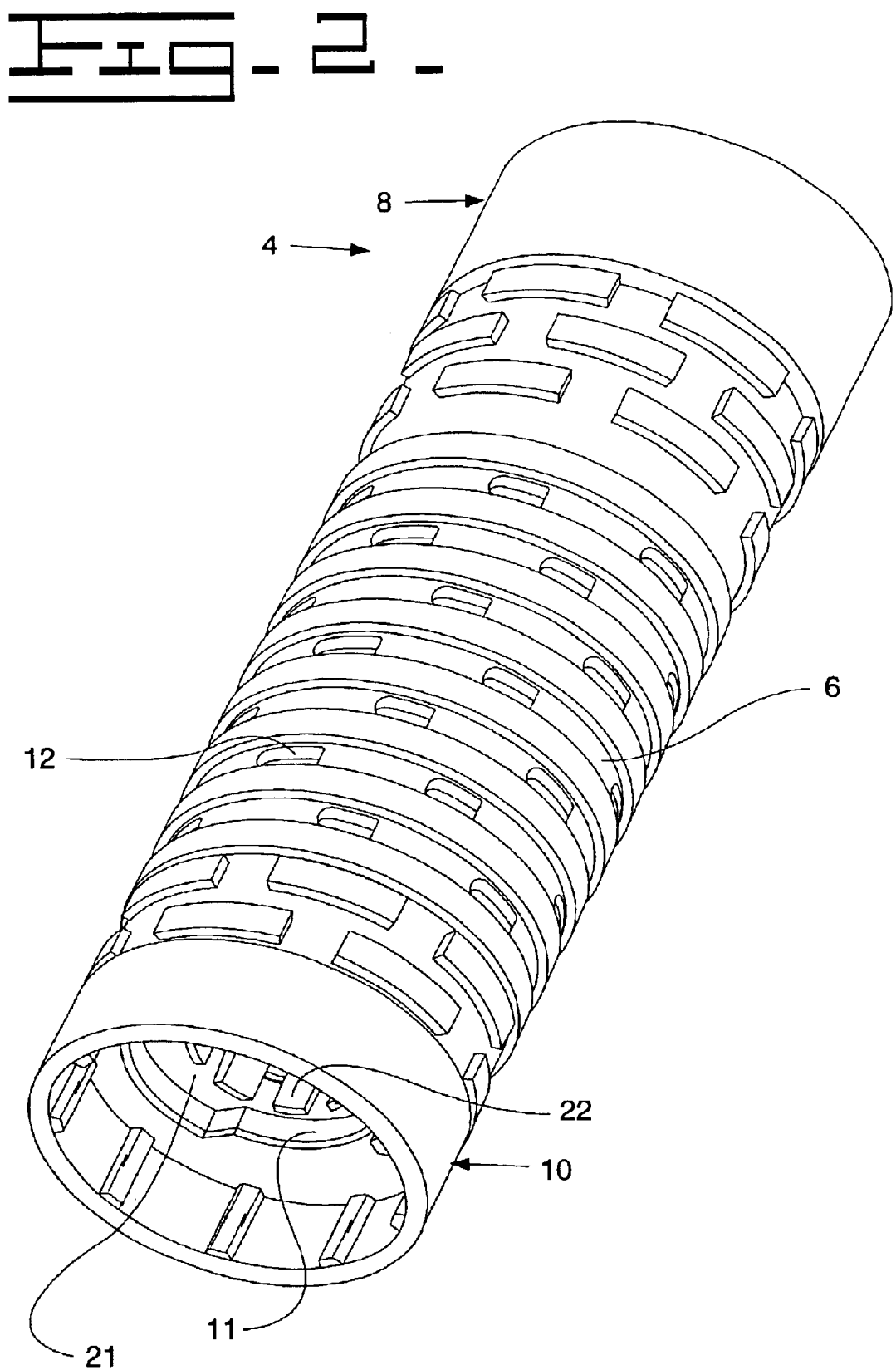
FIG. 2 is an isometric view of the preferred embodiment of the replaceable filter element.

Referring now to FIGS. 1 and 2. The replaceable filter element 4 comprises central tube 6, filter element 4 concentrically disposed about the central tube 6; filter coupling mechanism (shown as a threadable connection) adapted to connect filter element 4 to filter base 5, and locking mechanism 11 adapted to engage and lock filter element 4 with filter housing 14.

The filter element is a generally cylindrical construction with end caps retaining filter media. The filter media can be of any known construction including a pleated filter or solid filter construction. Although not shown, the preferred embodiment includes a pleated filter media that is integrally coupled with the end cap by means of pleat spaces that are molded into the end cap. The filter media further includes a plurality of acrylic beads interposed between the pleats and one or more pleat retaining bands. The acrylic beads function to eliminate pleat bunching and expose more filter media surface area during operation to capture more contaminants. The pleat retaining bands eliminate pleat flexing or movement thereby maximizing both filtration efficiency and filter life.

In the preferred embodiment, the replaceable filter element 4 employs a central tube member 6 defining a longitudinal axis 1 and having a plurality of apertures 12 radially disposed along the surface of the central tube. Central tube member 6 is preferably a non-metallic tube formed from a rigid polymer material. Not only is the non-metallic tube generally stronger than conventional metal tubes, the non-metallic material advantageously eliminates a source of undesirable metal particles or contaminates from entering the fluid system.

As illustrated, the central tube member 6 has a first end 8 or top portion and a second end 10 or bottom portion. The first end 8 of the central tube member 6 has threads 9 for mating with the threaded stud 3 of the filter base 5. In the preferred embodiment, the central tube member 6 has internal threads for threadably engaging an externally threaded stud 3 of the filter base 5. While this threadable coupling is shown as the preferred means for coupling the replaceable filter element 4 to the filter base 5, numerous other coupling mechanisms, including quick connect devices, and other mechanical coupling devices could be used with generally equal effectiveness.

The second end 10 of central tube member 6 provides a female locking mechanism 11. The female locking mechanism 11 may include an inverted cup-like or female receptacle 21 having a recess for receiving a corresponding male member 20. The female locking mechanism 11 is adapted for axially engaging or coupling and rotatably locking with the corresponding male member 20 that is preferably attached to the filter housing 14.

The female locking mechanism 11 is integrally disposed proximate the second end 10 of the central tube member 6. In the preferred embodiment, the female locking receptacle 21 is coaxially oriented with the central tube member 6. The female locking mechanism 11 also includes locking flanges 13 and a plurality of tangs 22 axially extending and spaced around the periphery of the female receptacle 21, the tangs 22 adapted for engaging and locking the corresponding male member 20 associated with the filter housing 14.

The reusable filter housing 14 is generally cylindrical in shape and has an open end 16 and a closed end 18. Preferably, the filter housing 14 is also constructed from a rigid polymer material that can be clear or opaque, depending upon the filter application. The open end 16 of the filter housing 14 has an annular sealing groove 15 and seal member 25 adapted for sealing the reusable filter housing 14 with the filter base 5.

Figure 3:
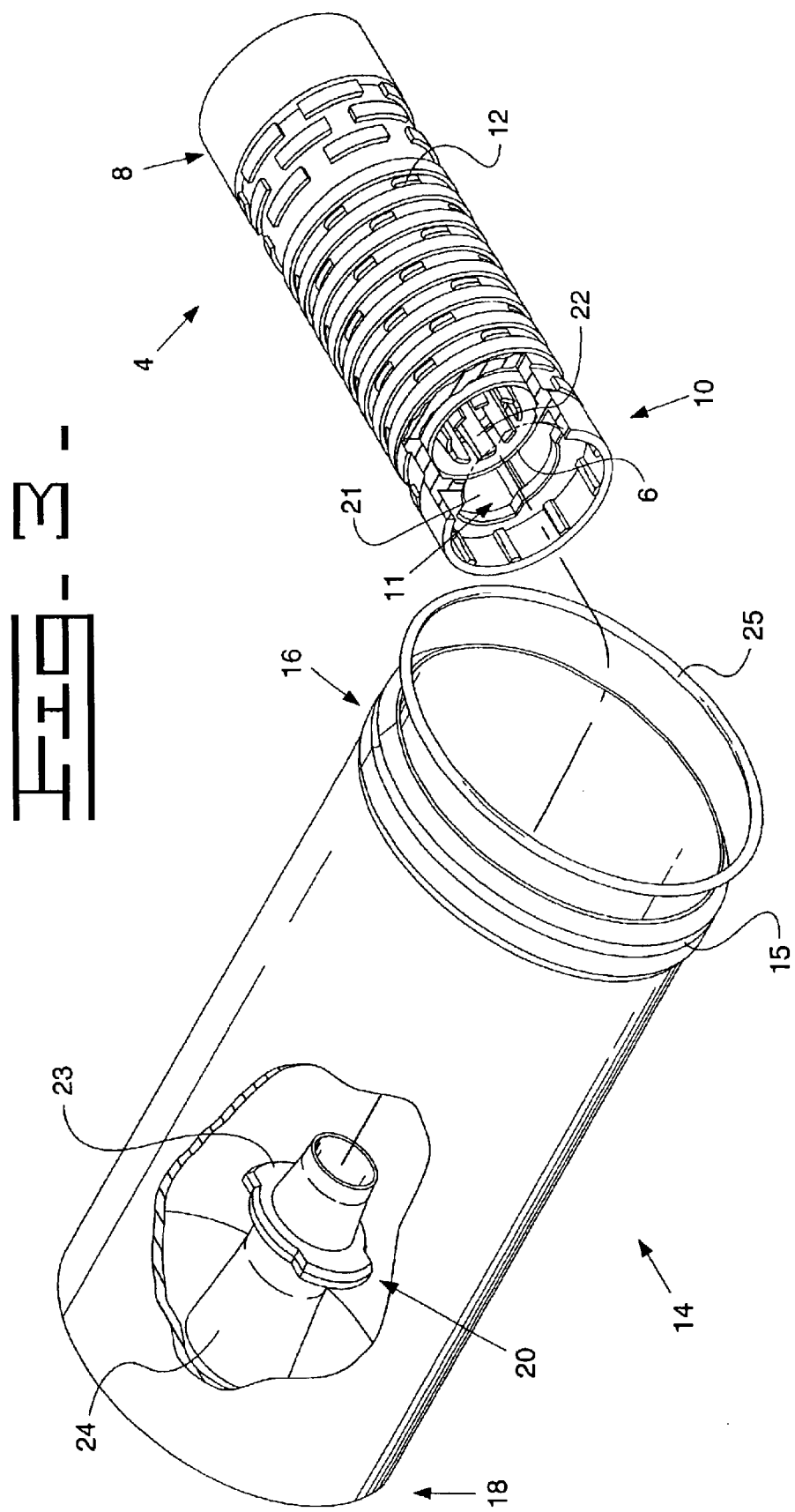
FIG. 3 is a perspective view of the filter assembly incorporating the replaceable filter element.

Turning now to FIG. 3, the closed end 18 of the filter housing 14 has a male member 20. The male member 20 comprises a male stem 24 that is generally cylindrical in shape with engaging flanges 23 at about 180 degrees to one another. The female locking mechanism 11 of the filter element 4 and corresponding male member 20 of the filter housing 14 is adapted for axially coupling and rotatably locking to one another. More specifically, as shown in FIGS. 3, 4, and 5, the male member 20 mates with the corresponding female receptacle 21 in the filter element 4. Engagement of the male member 20 and corresponding female receptacle 21 is accomplished alignment of the engaging flanges 23 with corresponding locking flanges 13 which define axial stops 28 of the female locking mechanism 11. The filter housing 14 and male member 20 are then rotated a prescribed amount (e.g. 90 degrees) in a prescribed direction (e.g. counterclockwise) to lock the filter housing 14 and the replaceable filter element 4 together. Several circumferentially located tangs 22 of the female locking mechanism 11 provide engagement and resistance so as to prevent the filter housing 14 (and male member 20) from further rotation relative to the filter element 4 (and female locking mechanism 11) once the engaging parts are locked into place.

Once the male member 20 and the tangs 22 are vertically engaged or coupled, the filter element 4 is rotated. The engagement flanges 23 are able to clear a short stopping mechanism 26 and continue rotation for about 90° where the engagement flanges 23 contact a tall stopping mechanism or rotating stop 27 that locks the filter element 4 and the filter housing 14 in place. The filter housing 14 is locked axially in place until the engagement flanges 23 are rotated back past the short stopping mechanism 26 when the filter housing 14 can be removed from the replaceable filter element 4.

In a preferred embodiment, a plurality of longitudinal ribs (not shown) are located on the housing and allow for easy assembly and removal of the filter assembly to the filter base as well as easy coupling and de-coupling of the filter element from the filter housing. Specifically, the longitudinal ribs provide a gripping surface, thereby eliminating the need for a strap wrench or similar device. Consequently, the assembly/removal process is easier and quicker. It should be noted that although longitudinal ribs are preferred, other gripping portions could be used, such as a textured surface or raised bumps.

It should be noted that although the best mode contemplates a gripping surface on a reusable housing, the gripping surface could also be implemented on a disposable housing-filter unit combination. In that design, the exterior housing would still contain a integral raised gripping surface, such as longitudinal ribs, but the filter element would not be removable and the entire housing-filter unit would be replaceable.

INDUSTRIAL APPLICABILITY

Reusable filter assemblies have been developed to replace disposable filter assemblies in order to decrease waste and money. However, the reusable type assemblies thread the housing into the filter base for installation. A service technician may inadvertently remove the used filter element and fail to replace it prior to reinstalling the filter housing or alternatively attempt to install a substandard filter. Both errors can cause debris to accumulate in the fluid system and eventually cause serious damage.

In the present invention, a replaceable filter element 4 and reusable filter housing 14 is disclosed which will not allow installation of the filter assembly 2 without a proper filter element 4 installed. This is due to two main features of the replaceable filter element 4. First, the filter element 4 includes a female locking mechanism 11 that rotatably couples and axially locks with a male member 20 formed as part of the filter housing 14. Second, the filter element 4 includes a top portion 8 of the central tube member 6, which attaches to the filter base 5 after the filter element 4 and the filter housing 14 are coupled.

To assemble the filter element 4 and the filter housing 14, the female locking mechanism 11 mates with the engagement flanges 23 situated on the male member 20 so that the tangs 22 of the female locking mechanism 11 slide over the male member 20 and provide resistance as the two mate. Once the male member 20 and the tangs 22 are vertically coupled, the filter element 4 is rotated about 90° in a first direction (e.g. counterclockwise) past short stopping mechanism 26 until one or more engagement flanges 23 contact a tall stopping mechanism or rotating stop 27 that locks filter element 4 to filter housing 14.

When properly coupled, the filter housing 14 cannot be axially removed due to the presence of the short stopping mechanism 26. The filter element 4 can only be removed from the filter housing 14 when the two parts are counter-rotated relative to each other in a direction opposite to which they were engaged until the engagement flange 23 clears the short stopping mechanism 26 and the filter housing 14 is free to disengage from the filter element in the axial direction.

Once coupled, the assembly is installed by attaching the central tube member 6 of the filter element 4 to the filter base 5. Preferably, the top portion 8 of the central tube member 6 has internal threads 9 that mate with and threadably engage external threads 13 of the stud 3 on filter base 5.

From the foregoing, it can be seen that the disclosed embodiment provides a replaceable filter with a locking mechanism and associated filter assembly. While the embodiment herein disclosed has been described by means of specific components and methods or processes associated therewith, numerous changes, modifications, and variations could be made thereto by those skilled in the art without departing from the scope of the invention as set forth in the claims.

What is claimed is:

1. A replaceable filter comprising:

a central tube defining an axis and having radially oriented apertures; said central tube including a first end and a second end along said axis;

a filter element disposed around the central tube;

a filter coupling mechanism disposed proximate said first end of said central tube;

a locking mechanism integrally disposed proximate said second end of said central tube, said locking mechanism having a female receptacle coaxially oriented with said central tube and a plurality of tangs axially extending substantially parallel with the axis thereof and spaced around the periphery of the female receptacle, said female receptacle also having locking flanges located thereon spaced from the plurality of tangs, said locking mechanism adapted being adaptable for engaging and locking a corresponding male member, said plurality of tangs being adaptable, when assembled, to contact the corresponding male member and operative to provide a rotational resistance between the central tube and the corresponding male member.

2. The replaceable filter of claim 1 wherein said central tube is non-metallic.

3. The replaceable filter of claim 1 wherein said coupling mechanism is a threaded socket adapted to receive a threaded stud.

4. The replaceable filter of claim 3 wherein said threads of said coupling mechanism are internally disposed on said central tube.

5. The replaceable filter of claim 1 wherein said replaceable filter is a replaceable fuel filter.

6. The replaceable filter of claim 1 wherein each of the locking flanges define an axial stop adapted to prevent axial movement on said corresponding male member.

7. The replaceable filter of claim 1 wherein said locking mechanism further includes a stop to limit the rotation of said corresponding male member within said female receptacle during assembly.

8. The replaceable filter of claim 1 wherein said corresponding male member is attached to a filter housing.

* * * * *